Nov. 19, 1968  H. FLEISSNER  3,411,220

APPARATUS FOR THE TREATMENT OF TEXTILE MATERIALS

Filed March 21, 1967

Inventor:
HEINZ FLEISSNER
BY
ATTORNEYS

3,411,220
APPARATUS FOR THE TREATMENT OF TEXTILE MATERIALS
Heinz Fleissner, Egelsbach, near Frankfurt am Main, Germany, assignor to VEPA AG, Basel, Switzerland
Filed Mar. 21, 1967, Ser. No. 624,880
Claims priority, application Germany, Mar. 21, 1966, A 51,908
19 Claims. (Cl. 34—115)

ABSTRACT OF THE DISCLOSURE

The present disclosure relates to an apparatus for the heat-treatment of textile materials, preferably materials which are permeable to air, comprising a substantially closed housing, at least one cylindrical sieve drum rotatably disposed within said housing, fan means for drawing the treatment medium, for example, air, through the material being treated and out of the interior of the sieve drum and means for providing a uniform temperature of the treatment medium drawn through the material being treated.

Background of the invention

The present invention relates to an apparatus for the heat-treatment of materials, preferably those which are permeable to air. The present apparatus can be used for drying textiles, loose fibrous materials, veneers and the like, and can also be used for fiber and dyestuff setting, for curing and polymerizing synthetic resins used as a finishing material, for carbonizing wool, and other like processes. More particularly, the present invention concerns an apparatus for the treatment of textile materials wherein means are provided for maintaining a substantially uniform temperature of the treatment medium which is drawn through the material being treated.

In known apparatus for the heat-treatment of textile materials, there exists the problem of maintaining a uniform treatment temperature throughout the treatment apparatus. In known apparatus, heater batteries are usually provided above and beneath the fan wheels. In an effort to obtain uniform heating, instead of or in addition to these heaters, heating means have also been arranged above and beneath the sieve drum. However, it has been found that the heat-treatment, for example, drying, has not been effective, uniformly over the working width, that is, the treatment and especially the drying capacity is generally lower at that portion of the sieve drum which is removed from the exhaust side of the sieve drum where the fan is disposed. When treating small working widths of textile materials, the drying variations are generally within admissible limits and therefor can be frequently disregarded. However, when treating large working widths of textile materials and especially when treating fiber and dyestuffs setting and materials which are impregnated with synthetic resins, the temperature variations of the treatment medium are generally much greater and in the case of dyestuffs setting, for example, they can cause differences in the shade of the dye and with synthetic resin finishing, for example, a migration of the synthetic resins can result. These varying treatment effects can generally be attributed to a varying suction draft in the sieve drum which, among other factors, is caused by the fact that the suction draft is more powerful at the exhaust side of the sieve drum than at the side removed from said exhaust side containing the fan means. It has been suggested that a uniform suction draft over the entire working width of the sieve drum can be obtained by providing insulations in the sieve drum. These insulations have effected a uniform suction draft over the working width of the sieve drum, but the aforementioned variations in the treatment temperature have been found to still exist in spite of these insulations. Measurements have shown that these temperature variations can be attributed to the fact that the temperatures of the treatment medium are lower near the front longitudinal wall of the sieve drum, that is, at that side of the sieve drum most removed from the fan means.

Accordingly, it is an object of the present invention to avoid the prior art disadvantages in heat-treatment apparatus.

Another object of the present invention is to provide an improved apparatus for heat-treating various types of materials, for example, textile materials, by providing means for establishing a substantially uniform temperature of the treatment medium in the sieve drum.

A further object of the present invention is to provide an improved apparatus for maintaining a uniform treatment temperature in a sieve drum wherein large working widths of textile materials can be uniformly treated while at the same time maintaining good flow conditions.

A still further object of the present invention is to provide an improved apparatus for the heat-treatment of textile materials wherein dyestuff setting can be effected while maintaining a uniform shade and textile materials containing synthetic resins can be finished without a migration of said synthetic resins.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Summary of the invention

According to the present invention, it has been found that air masses which flow along the ceiling of the housing and along the bottom of the housing transmit heat to said housing and therefor cool down. Since generally the suction draft in the sieve drums is interrupted by baffle means arranged in the sieve drums at those portions of the sieve drums which are not covered by the material being treated, air flow usually occurs between the housing and the drum bottom. The air flowing along the front longitudinal wall of the housing is thus even further cooled down. Because of these currents, if loose fibrous materials or similar type materials are being treated, the material is frequently blown toward the middle of the treating surface and in some instances is blown off said surfaces.

Accordingly to the present invention, means are provided in the housing and in the sieve drum which prevent a cooling down of the treatment medium and/or a variation of the temperature of the treatment medium which is drawn through the material being treated. According to one embodiment of the present invention, at least one suction opening can be provided in the faces of the sieve drums which do not contain the fan means. Through this suction opening, the treatment medium, for example, air which flows along the housing and which has thus been cooled down is exhausted without being drawn through the material adhering to the sieve drums and/or without coming into contact with said material. In order to control the quantity of air which is drawn through these suction openings, it is desirable, in a further embodiment of the present invention, to provide an adjustable covering for each suction opening so that the free area of the suction opening can be infinitely controlled from a completely closed position to a completely opened position.

In another embodiment of the present invention an inner housing means can be disposed between the closed housing means and the cylindrical surface of said sieve drums, said inner housing means together with said closed housing means defining a chamber which provides insulation for the treatment medium flowing between said inner housing means and said sieve drum surface. The inner housing means can extend in the ceiling and in the bottom of the closed housing and also to the longitudinal wall of the apparatus where no fan means are disposed. By using inner housing means heat losses and cooling down of the air flowing along this portion of the housing are substantially reduced. In another feature of the present invention, heating means may also be provided to heat the inner housing and/or the space between the two housings.

In the apparatus of the present invention, sieve sheets are generally provided above and beneath the sieve drums and extended a predetermined distance from said sieve drums to achieve an equalization of the treatment medium. If materials which can be easily be blown off of the sieve drums are being treated, concentrically curved sieve sheets are arranged around those portions of the sieve drums which are carrying the material being treated, in addition to or instead of the aforementioned sieve sheets. In spite of using these measures, the material being treated is still frequently blown off the sieve drums or toward the middle of the sieve drums causing temperature variations to occur. According to another embodiment of the present invention, it has been found to be advantageous to provide bottoms between the sieve sheets and the perforated drum jackets. Tests using these bottoms have shown that not only a blowing off of the materials is avoided but also substantially more uniform temperature conditions prevail.

Instead of the aforementioned bottoms, the air flow at least between the drum bottom which does not contain the fan means and the longitudinal wall of the closed housing can be avoided by other means, for example, by a baffle sheet or, as has already been suggested, by drawing in a certain quantity of the treatment medium at the face of the sieve drum. When using concentrically curved sieve sheets around the sieve drums, it is frequently advantageous to subdivide the sieve sheets and to arrange the individual parts in such a manner that they can be readily removed or slided so that good accessibility to the space between the sieve sheet and the sieve drum is ensured.

In presently known sieve drum apparatus, the fresh air is generally sucked in at the outlet by the last sieve drum. Thus, the varying suction draft in the sieve drum has the effect that at the fan side of said drum more fresh air is drawn in than at the side away from the fan means. Due to this varying aspiration of the fresh air, substantial temperature variations result at that sieve drum. In order to overcome these difficulties and in accordance with another embodiment of the present invention, it is suggested to provide a suction opening at the longitudinal wall of the housing on that side of the apparatus away from the fan means, advantageously at the level of the drum bottom if said sieve drum bottom is also provided with at least one suction opening. Using this measure, the fresh air can be passed through the sieve drum without it coming into contact with the material being treated, and can subsequently be uniformly heated by means of heater batteries and mixed with the circulating air. In a further feature of the present invention, suction openings providing fresh air to several sieve drums may be disposed in the adjacent longitudinal wall of the housing. By using appropriate accessories and by providing means for controlling the size of the suction openings from a closed position to an open position or any intermediate position in between, it is possible to accurately control the quantities of the fresh air drawn into the apparatus and thus to compensate for the temperature variations which occasionally prevail from sieve drum to sieve drum. In apparatus which have no suction openings and/or openings in the sieve drum bottom, fresh air can be supplied to the high-pressure space between the fan means and the heater by means of an additional fan means. Again, the fresh air can be supplied at various points of the heat-treatment apparatus.

When using the usual air circulation system, that is, drawing in the fresh air at the outlet and discharging the spent air near the intake and/or in the fan chamber of the first sieve drum, uniform temperatures can be obtained by preheating the fresh air. On the other hand, uniform temperatures can also be achieved by correlating a device for preheating the fresh air introduced to the sieve drum apparatus or, on the other hand, by heating the outlet and/or inlet means, for example, the roller and/or rollers, conveyor belts and/or chutes and by heating up the fresh air entering the dryer which flows around these parts. Furthermore, it is frequently advantageous to provide several discharge ducts whereby the quantity of air discharged through these ducts can be controlled, for example, by means of flaps.

Brief description of the drawings

The present invention will become fully understood from the detailed description hereinbelow and the accompanying drawings which are given by way of illustration only and thus are not limitative of the present invention and wherein.

Description of the preferred embodiments

Figure 2:
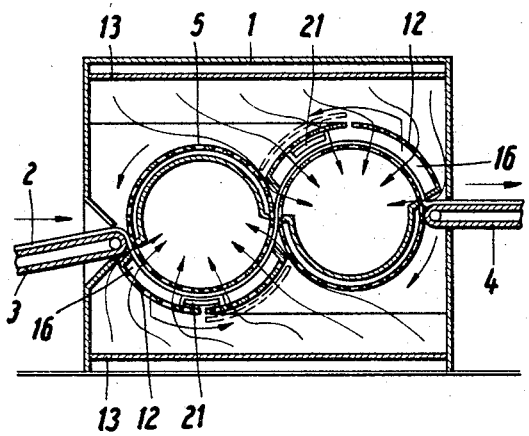
FIGURE 2 is a longitudinal section of the sieve drum dryer according to FIGURE 1.

Referring now to the drawings wherein like reference numerals are used throughout the various views to designate like parts, the apparatus of the present invention comprises a substantially closed, heat-insulated housing 1 which is provided wtih conveyor belts 3 and 4 at the inlet and the outlet for feeding and discharging the material 2 to be treated. Instead of these conveyor belts, rollers may be provided at the inlet and a chute as well as rollers can be provided at the outlet. In the housing 1, sieve drums 5 subjected to a suction draft are provided for guiding the material 2. The suction draft is produced by fan wheels 6 which are correlated to the faces of the sieve drums and separated from the sieve drums by a partition means 7. The partition means subdivide the apparatus into a treatment chamber 8 in which sieve drums 5 are accommodated and to a fan chamber 9 in which the fan wheels 6 as well as heater batteries 10 are arranged both above and beneath the fan wheels 6. In the sieve drums, the suction draft is interrupted by baffle means 11 at those portions of the sieve drums which are not covered with the material being treated. For equalizing the air flow, concentrically curved sieve sheets 12 can be provided around the sieve drums 5 at those portions of said sieve drums which are covered with the material being treated. In FIGURE 2, the sieve sheets are shown in the operating position. To provide accessibility to the space between the sieve sheet and the sieve drum, the right hand segment of the sieve sheet can be displaced by lifting it radially outwardly and sliding it in the direction indicated by the arrow over the other segment of the sieve sheet as shown by the segment of dotted lines.

In order to widely eliminate a cooling down of the air which flows immediately along the housing 1 and along the bottom of the apparatus, sheets 13 (the inner housing) are arranged in the closed housing and are supported preferably in a pivotable manner at pivot points 30 and provided with face sheets 12 which can be tilted in the inward direction. A free space 15 between the sheets 13 and 14 (the internal housing) and the substantially closed housing 1 is filled with air which provides a good insulating effect for the apparatus. In situations where this insulating effect is not sufficient, a heating means 10' may be disposed in this free space.

In order to avoid an air exchange between that portion of the sieve drum which is free from material being treated and that portion which is covered with the material being treated and subjected to a suction draft, bottom means 16 are arranged between the concentrically curved sieve sheets 12 and the sieve drums. By using these bottom means 16, a desirable improvement in the air flow is effected apart from an equalization of the treatment temperature. Instead of using bottom means 16, baffle sheets 17, as shown by the dashed lines, may also be disposed between the sieve drum bottoms 31 and the longitudinal wall 32 of housing 1 and/or the partition 7. These baffle sheets prevent a flow between the housing and the sieve drum bottom and also produce not only better temperature conditions but also substantially better flow conditions in the apparatus of the present invention.

In the apparatus of the present invention, the fresh air can be blown into the fan chamber 9 by means of a fan 18. In apparatus with a large number of sieve drums, fresh air can be supplied at various points by using several fan means. The fresh air is thus passed over heaters 10 and heated up to the treatment temperature before it comes into contact with material 2 on the sieve drums 5. Fan drive 19 and sieve drum drive 20 are fastened to housing 1 in this embodiment of the present invention.

In presently used sieve drum apparatus, windows (not shown) are provided in housing 1 in order to make it possible to control the material guidance on the sieve drums. As can be readily seen by referring to FIGURE 2, windows 21 can also be provided in bottom 16. However, it is also possible to make these bottoms or at least the front bottom 16 of transparent material.

Figure 1:
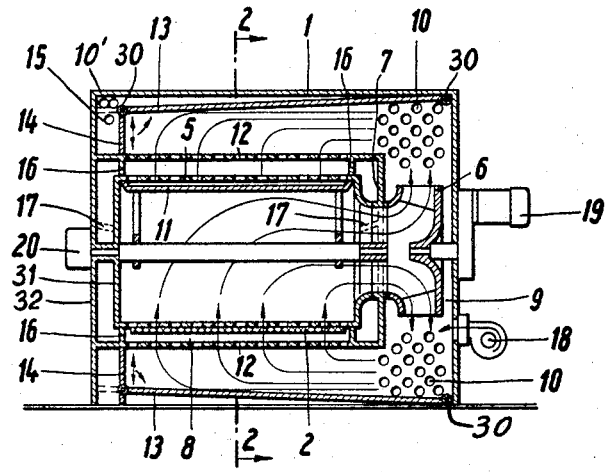
FIGURE 1 is a cross-sectional view of a sieve drum dryer according to the present invention.
Figure 3:
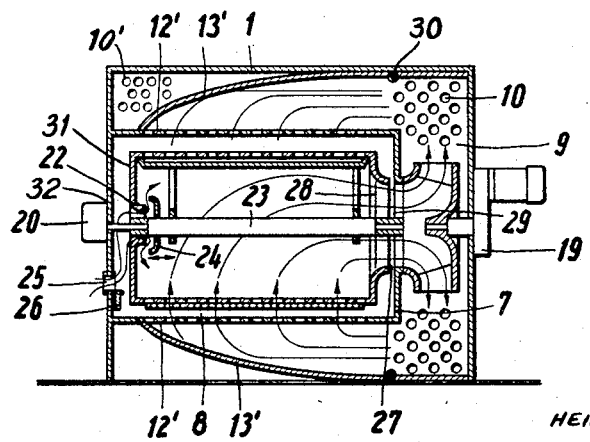
FIGURE 3 is a cross-sectional view of another sieve drum dryer according to the present invention.

The apparatus according to FIGURE 3 is designed similarly to the apparatus according to FIGURES 1 and 2. The same components are marked with the same numbers. In this apparatus instead of concentrically curved sheets 12 above and below the sieve drums 5, plane sieve sheets 12' are provided. Also sheets 13' are arranged and shaped slightly different. In the apparatus according to the present invention, sieve drums 5 can be provided with a concentric opening 22 in the sieve drum bottom 31 at that side of the apparatus which does not contain the fan means, and said opening can be opened or closed by means of an adjustable cover 24 which is mounted to the sieve drum axis 23. By adjusting the cover 24 the quantity of air drawn in through opening 22 can be infinitely controlled. It is advantageous to adjust the quantity of air drawn in through opening 22 in such a manner that the air flowing into the space between the sieve drum bottom and the housing and the fresh air entering through opening 25 in the longitudinal wall of the housing is drawn into the sieve drum. The openings 25 for drawing in fresh air can be partially or completely closed by swiveling flap 26 so that the quantity of fresh air drawn in at each individual sieve drum 5 may be different and may be adjusted infinitely. If necessary, a certain quantity of the treatment medium can be drawn in through a slit 27 between drum spider 28 and fan spider 29. In known apparatus, this slit 27 is sealed by means of an elastic sealing ring. By omitting this sealing ring, the quantity of air can be drawn off which otherwise flows from that portion of the sieve drum which is not covered with the material being treated to that portion of the sieve drum which is covered with the material being treated, and which in the case of loose fibrous materials, can result in a blowing off of said material.

Since modifications of this invention will be apparent to those skilled in the art, it is not desired to limit the invention to the exact constitution shown and described. Accordingly, all suitable modifications and equivalents may be resorted to which fall within the scope of the appended claims.

I claim:

1. An apparatus for the treatment of materials which comprises a closed housing, at least one cylindrical sieve drum disposed within said housing, a portion of the cylindrical surface of said sieve drum serving as a conveying means, inlet means for introducing the material to be treated to said conveying means, fan means communicating with the interior of said sieve drum for drawing the treatment medium out of said sieve drum, heating means provided within the circulation of the treatment medium, at least one suction opening provided in the face of the sieve drum which is removed from that face associated with fan means, said suction opening being provided with an adjustable cover means to vary the free area of the suction opening, and outlet means for removing the treated material from the sieve drum.

2. The apparatus of claim 1, wherein the suction opening is coaxially disposed around the sieve drum axis.

3. The apparatus of claim 1, wherein at least one suction opening is provided at the fan side in the sieve drum bottom.

4. The apparatus of claim 3, wherein at least one suction opening is provided between the sieve drum and the fan means.

5. The apparatus of claim 1, wherein an inner housing means is disposed between the closed housing means and the cylindrical surface of said sieve drums, said inner housing means together with said closed housing means defining a chamber which provides insulation for the treatment medium flowing between said inner housing means and said sieve drum means.

6. The apparatus of claim 5, wherein the inner housing means extends from the longitudinal wall of the treatment housing nearest the fan means to the longitudinal wall of the treatment housing most removed from the fan means.

7. The apparatus of claim 6, wherein the inner housing is pivotably disposed within the closed housing.

8. The apparatus of claim 5, wherein the inner housing means extends from the longitudinal wall of the treatment housing nearest the fan means to the longitudinal wall of the sieve drum bottom most removed from said fan means.

9. The apparatus of claim 8, wherein the inner housing is pivotably disposed within the closed housing.

10. The apparatus of claim 5, wherein the chamber defined by the closed housing and the inner housing is provided with heating means.

11. The apparatus of claim 1, wherein concentrically curved sieve sheets are disposed around that portion of each sieve drum which is in contact with the material being treated and wherein baffle bottoms are provided between the sieve sheets and the sieve drum jackets near the two sieve drum ends.

12. The apparatus of claim 11, wherein the baffle bottoms are provided with at least one window means.

13. The apparatus of claim 12, wherein the baffle bottoms are made of a transparent material.

14. The apparatus of claim 11, wherein the concentrically curved sieve sheets are subdivided into individual components which can be removed or which are slidably disposed around said sieve drums.

15. The apparatus of claim 1, wherein a baffle sheet means is provided between the drum bottom and the longitudinal wall of the treatment housing on the opposite side of the sieve drum from the fan means, said baffle sheet interrupting the air flow at said sieve drum bottom.

16. The apparatus of claim 1, wherein at least one suction opening is provided in the longitudinal wall of the treatment housing on the opposite side of the sieve drum from the fan means, and at the level of the sieve drums.

17. The apparatus of claim 1, wherein suction openings for fresh air are provided for several sieve drums in the adjacent longitudinal wall of the treatment housing.

18. The apparatus of claim 1, wherein additional fan means are provided in the treatment housing for introducing fresh air to the high-pressure space between the fan means and the heating means.

19. The apparatus of claim 18, wherein a means is provided for preheating the fresh air.

References Cited

UNITED STATES PATENTS

| 3,011,266 | 12/1961 | Fleissner | 34—115 XR |
| 3,140,157 | 7/1964 | Fleissner | 34—115 |

FOREIGN PATENTS

| 1,255,850 | 1/1961 | France. |
| 944,999 | 12/1963 | Great Britain. |

FREDERICK L. MATTESON, JR., *Primary Examiner.*

A. D. HERRMANN, *Assistant Examiner.*